April 9, 1935.  L. J. DE LANTY  1,996,906
METHOD AND MEANS FOR DETECTING FLAWS IN ELECTRICAL CONDUCTORS
Filed Nov. 14, 1933
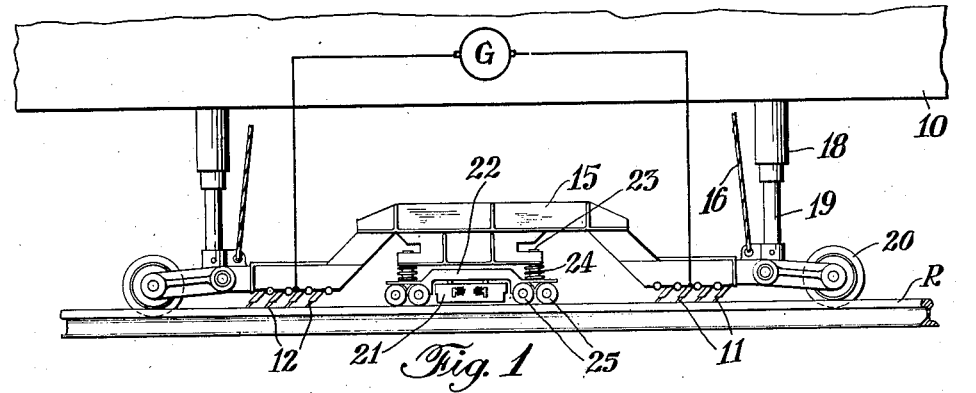
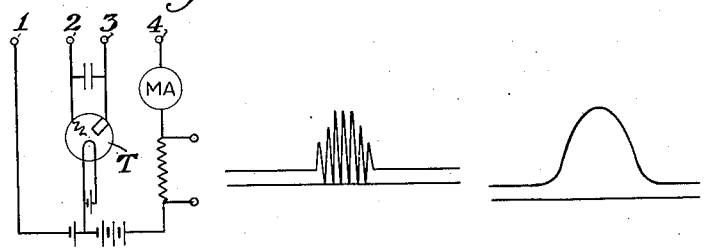
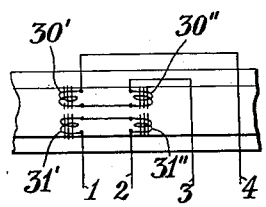
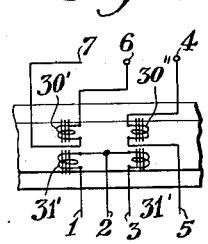
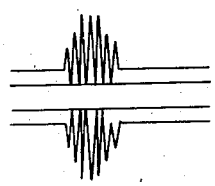
Inventor
LOREN J. DE LANTY
By Joseph H. Lipschutz
Attorney Patented Apr. 9, 1935

1,996,906

UNITED STATES PATENT OFFICE

1,996,906

METHOD AND MEANS FOR DETECTING FLAWS IN ELECTRICAL CONDUCTORS

Loren J. De Lanty, Spring Valley, N. Y., assignor to Sperry Products, Inc., Brooklyn, N. Y., a corporation of New York Application November 14, 1933, Serial No. 697,888

9 Claims. (Cl. 175—183)

This invention relates to a method of and means for detecting defects in electrical conductors. The method now employed for such detection, particularly for rail flaw detection, is the Sperry method of sending a current through the conductor under test to establish an electromagnetic field surrounding the same and then moving inductive means through said field so that irregularities in the field caused by defects will induce an E. M. F. which, after being suitably amplified, is caused to operate some form of indicator.

It is the principal object of my invention to provide another method of flaw detection which is based upon the principle of causing variations in flux set up by flaws in the conductor under test to vary an oscillatory circuit. Various embodiments of my invention are described herein.

Further objects and advantages of my invention will become apparent in the following detailed description.

In the accompanying drawing,

Fig. 1 is a side elevation of a portion of a rail flaw detector mechanism showing my invention applied thereto.

Fig. 2 is a detail of the search unit employed in my invention.

Fig. 3 is a view of the oscillatory circuit designed to be controlled by the said search unit.

Fig. 4 is an oscillogram of the output of the oscillating circuit both normal and in the region of a defect.

Fig. 5 is a diagram of the amplified output of the oscillatory circuit.

Fig. 6 is a plan view of a rail showing a modified form of search unit embodying my invention.

Fig. 7 is a diagram of the oscillatory circuit employed in connection with the Fig. 6 form of search unit.

Fig. 8 is an oscillogram of the output of the oscillator shown in Fig. 7.

Fig. 9 is a diagram of the amplified output of the oscillator of Fig. 7.

Fig. 10 is a plan view similar to Fig. 6 showing another hook-up of the stearch unit shown in Fig. 6.

Fig. 11 is a diagram of the oscillatory circuits employed in connection with the Fig. 10 form of search unit.

Fig. 12 shows the oscillograms of the output of the Fig. 11 form of oscillator.

Fig. 13 is a diagram of the amplified outputs of the oscillator of Fig. 11.

Fig. 14 is a view similar to Fig. 12 but showing another output caused by the oscillator of Fig. 11.

Referring to the drawing, I have shown the form of flaw detector for electrical conductors which I have herein invented as applied to a rail flaw detector device, although it will be understood that my invention has general application to the testing of electrical conductors. In the embodiment shown in Fig. 1, my invention is applied to a rail fissure detector car adapted to travel along the rails to detect defects therein. A portion of the car body 10 is shown and said car body has mounted therein a generator G for supplying current to the rail through sets of brushes 11, 12 supported on a current brush carriage 15. Said carriage is normally held in elevated position by means such as retractile springs (not shown) and cables 16, but may be lowered into engagement with the rail R by means of fluid pressure supplied to cylinders 18 within which operate piston rods 19 connected to the current brush carriage. Said carriage may be supported on the rail by means such as flanged wheels 20. The current thus supplied to the rail establishes an electromagnetic field surrounding the same and said electromagnetic field will be uniform except in the region of a flaw, where said field will be distorted. Such distortions may be detected by a search unit comprising housing 21 mounted on a detector carriage 22 for movement independent of the current brush carriage by means of loose-fitting bolts 23 and springs 24. Said detector carriage may operate along the rails by means such as rollers 25.

Within said housing 21 are the detector elements which in the form shown in Fig. 2 comprise a pair of coils 30, 31 positioned with their axes parallel to the axis of current through the rail and arranged to be magnetically coupled. Since the axes of coils 30, 31 are parallel to the axis of the current through the conductor, there will normally be no magnetomotive forces tending to link the coils 30 and 31, the flux distribution being uniform around the conductor. Said elements 30 and 31 may be provided with cores 32 and 33 to increase the effect of the flux through coils 30 and 31. However, when a region of flaw is encountered, the axis of the current through the conductor is distorted and this causes a distortion of the flux distribution surrounding the conductor to affect the degree of magnetic coupling between the coils 30 and 31. I utilize this variation in magnetic coupling to vary an oscillatory circuit.

The variation of the oscillatory circuit mentioned above may take the form either of reducing or completely stopping the oscillation of a circuit which is normally in oscillation, or, preferably, it may cause an oscillation to be set up in an oscillatory circuit in which there normally is no oscillation. For this purpose, I may connect one of the coils 30 and 31, in this case coil 30, in the grid circuit of an oscillating tube T by connections 1, 2, and the other coil 31 in the plate circuit by terminals 3, 4. Thus, it will be seen that when a region of flaw is encountered to change the magnetic coupling between the coils 30 and 31, the voltages in the grid circuit and the plate circuit are changed, and such change may be caused to set up an oscillation where previously the circuit had been non-oscillating, or if the constants in the circuit were such that the circuit was oscillating the change in magnetic coupling between coils 30 and 31 would vary or eliminate the oscillation. These constants are the initial voltages of the grid and plate, the structure of the magnetic circuits, and the characteristics of the coils. If said constants are arranged to bring the circuit normally just to the point of oscillation, then a change in the magnetic coupling between coils 30 and 31 will set up an oscillation.

The output of the oscillatory circuit is shown in Fig. 4 in the form of an oscillogram, and the output of said circuit after being amplified is indicated graphically in Fig. 5.

One significant result flowing from the above described method of detection is that the output illustrated in Fig. 5 is independent of the speed of the car along the track. In the Sperry rail car mechanism now employed, the inductive means must be moved not only at a constant distance above the rail, but at a constant speed, because induction is a function of the rate of cutting of the lines of force. In the form of the invention described above, it will be seen that this system is independent of the rate of cutting of lines of force and depends merely upon the position of the lines of force relative to the two coils 30 and 31. In other words, it depends upon the extent of magnetic coupling which is not dependent upon the speed with which said coils pass through the field.

The extent of coupling determines the extent or amplitude of oscillation; the speed of travel determines the number of oscillations comprising the characteristic group at the flaw. This group may be amplified, by an amplifier responsive to the oscillatory frequency, very efficiently and without discrimination of characteristic group forms. In the Sperry system described, the characteristic form must be dealt with as the fundamental frequency to be amplified. Consequently, form and frequency variation become difficult variables to handle efficiently.

In Fig. 6 I have illustrated a form of search unit which is a modification of the form shown in Fig. 2 which is adapted to yield a larger output and at the same time prevent indications from coming through which are not caused by flaws but which are due to such causes as variations in the supply of current from generator G to the conductor or movements of the housing 21 with respect to the surface of the conductor. For this purpose I have shown two sets of magnetically coupled coils 30', 31' and 30'', 31'', each of which may be provided with a core similar to cores 32, 33, but instead of positioning each set of coils with the axes parallel to the current axis I position them with the axes normal to the direction of current. Thus, whereas in the Fig. 2 form there is normally no flux between the coils 30 and 31, such flux being present only when a flaw is present, in the Fig. 6 form there is normally a flux between said coils, but I cause corresponding coils of each set to be connected in opposition, that is to say, 30' and 30'', 31' and 31'' are connected in opposition so that normally there is no output from the two pairs of coils. The output of coils 31' and 31'' are connected to the terminals 1 and 2, while the outputs of the coils 30' and 30'' are connected to the terminals 3 and 4 of the oscillating tube T. When passing through a region of flaw the magnetic coupling will be changed first between the pair of coils 30' and 31' which will give an unbalance between the two sets of coils to vary the oscillation in the oscillatory circuit of Fig. 7, and then a second impulse will be obtained when the pair of coils 30'', 31'' passes through the region of flaw to vary the oscillatory circuit of Fig. 7 a second time. The output of said oscillatory circuit is shown in Fig. 8 and consists in two impulses which after being amplified will give the output shown in Fig. 9. Thus, a differential output is obtained, but in addition the balanced relation and opposed connections between coils 30', 30'' and 31', 31'' prevent change in flux due to surges of current or other irregularities in current supply, or movement of the housing 21 with respect to the surface of the conductor into a region of greater or lesser flux density, from having any affect on the oscillatory circuit of Fig. 7 because both sets of coils are equally, oppositely, and simultaneously affected thereby.

A result similar to that obtained with the Figs. 6 and 7 form of the invention may be obtained in the form of invention disclosed in Figs. 10 and 11. The same sets of coils 30', 31', 30'', 31'' are employed, but instead of employing a single oscillatory circuit, I may employ two oscillatory circuits as shown. Said circuits comprise a common connection 2 and the outputs of coils 31', 31'' are connected to the grid circuits 1 and 3 of the respective oscillatory circuits of tubes T' and T''. The output from coil 30' is connected to the plate circuit at terminal 6 of one oscillatory circuit, while the output of coil 30'' is connected at terminal 4 to the plate circuit of the other oscillatory circuit. The outputs from the oscillatory circuits are led into two sides of a meter circuit by way of terminals 4 and 6, and thence through coils 30' and 30'' to terminals 5 and 7 so that the output of the first oscillatory circuit by way of terminal 6 discharges into terminal 7 through one-half of the resistance R' to the indicator MA, while the output from the other oscillatory circuit discharges from terminal 4 to terminal 5 and into the meter MA through the other half of the resistance R'. The meter MA is connected to the mid-point of resistance R' by way of common connection 40. The said two oscillatory circuits are rendered 180 degrees out of phase by reason of the direction of connections of the coils in the circuits. Therefore, on passing through a region of flaw the two oscillatory circuits will discharge successively and in an out of phase relation as shown in Fig. 12. The amplified output from this oscillatory system is shown in Fig. 13. If a variation in current supply occurs, or the housing 21 moves with respect to the rail, there will be a discharge from both oscillatory circuits in opposite phase, but instead of being successive as in Fig. 12, they will occur simultaneously as shown in Fig. 14, the theoretical average value of the resultant wave across R' therefore being zero, thus wiping each other out so that any variations due to causes other than defects in the conductor will not come through.

The combination shown in Figs. 10-14 form of the invention has the inherent advantage that the searching unit is balanced and the oscillatory system is also balanced, thus giving a twofold means for eliminating the effect of surge and movement factors which would otherwise interfere with perfect detection.

It will be understood that the outputs illustrated in Figs. 5, 9, and 13 may be caused to operate any suitable indicating system through such means as relays controlling, for example, pens operating on a chart.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting flaws in electrical conductors which consists in passing current through the conductor to establish an electromagnetic field surrounding the same, investigating said field by means of an oscillatory circuit including a pair of magnetically coupled coils, and indicating the variations in said oscillatory circuit due to variations in the flux of said field caused by flaws in the conductor.

2. In a device for detecting flaws in electrical conductors, means for passing current through the conductor to establish an electromagnetic field surrounding the same, and flaw responsive means comprising an oscillatory circuit including a plurality of magnetically coupled coils, and means whereby variations in said coupling due to flaws within said conductor vary said circuit.

3. In a device for detecting flaws in electrical conductors, means for passing current through the conductor to establish an electromagnetic field surrounding the same, flaw responsive means comprising a plurality of magnetically coupled coils positioned with their axes parallel to the axis of current through the conductor so that normally no flux passes between said coils, and means responsive to variations in said coupling.

4. In a device for detecting flaws in electrical conductors, means for passing current through the conductor to establish an electromagnetic field surrounding the same, flaw responsive means comprising an oscillatory circuit including a plurality of magnetically coupled coils positioned with their axes parallel to the axis of current through the conductor so that normally no flux passes between said coils, and means whereby variations in said coupling vary said circuit.

5. In a device for detecting flaws in electrical conductors, means for passing current through the conductor to establish an electromagnetic field surounding the same, flaw responsive means comprising a plurality of sets of coils, the coils in each set being magnetically coupled and the corresponding coils of said sets being of equal inductance and oppositely connected, and means responsive to variations in said couplings.

6. In a device for detecting flaws in electrical conductors, means for passing current through the conductor to establish an electromagnetic field surrounding the same, flaw responsive means comprising an oscillatory circuit including a plurality of sets of coils, the coils in each set being magnetically coupled and the corresponding coils of said sets being of equal inductance and oppositely connected, and means whereby differential variations in said couplings vary said circuit.

7. In a device for detecting flaws in electrical conductors, means for passing current through the conductor to establish an electromagnetic field surrounding the same, flaw responsive means comprising a plurality of sets of coils arranged with their axes normally at right angles to the axis of the current through the conductor, the coils in each set being magnetically coupled and the corresponding coils of said sets being of equal inductance and oppositely connected, and means responsive to variations in said couplings.

8. In a device for detecting flaws in electrical conductors, means for passing current through the conductor to establish an electromagnetic field surrounding the same, flaw responsive means comprising a plurality of oscillatory circuits including a plurality of sets of coils, the coils in each set being magnetically coupled and the corresponding coils of said sets being of equal inductance and oppositely connected, means for rendering said circuits out of phase, and means whereby variations in said couplings vary said circuits.

9. In a device for detecting flaws in electrical conductors, means for passing current through the conductor to establish an electromagnetic field surrounding the same, flaw responsive means comprising a plurality of oscillatory circuits including a plurality of sets of coils, the coils in each set being magnetically coupled and the corresponding coils of said sets being of equal inductance and oppositely connected, means for rendering said circuits 180 degrees out of phase, and means whereby variations in said couplings vary said circuits.

LOREN J. DE LANTY.